(12) United States Patent
Colmagro et al.

(10) Patent No.: US 10,814,994 B2
(45) Date of Patent: Oct. 27, 2020

(54) PRIMARY SUPPORT STRUCTURE FOR AN AIRCRAFT POWER PLANT SUPPORT PYLON

(71) Applicant: AIRBUS OPERATIONS (S.A.S.), Toulouse (FR)

(72) Inventors: Jérôme Colmagro, Toulouse (FR); Julien Moulis, Le Castera (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 14 days.

(21) Appl. No.: 16/172,498

(22) Filed: Oct. 26, 2018

(65) Prior Publication Data

US 2019/0127074 A1 May 2, 2019

(30) Foreign Application Priority Data

Oct. 27, 2017 (FR) ..................................... 17 60190

(51) Int. Cl.
*B64D 27/26* (2006.01)
*B64F 5/10* (2017.01)
*B33Y 80/00* (2015.01)
*B64D 27/20* (2006.01)
*B64D 27/12* (2006.01)

(52) U.S. Cl.
CPC ............. *B64D 27/26* (2013.01); *B64D 27/20* (2013.01); *B64F 5/10* (2017.01); *B33Y 80/00* (2014.12); *B64D 27/12* (2013.01); *B64D 2027/264* (2013.01)

(58) Field of Classification Search
CPC ........ B64D 27/26; B64D 27/12; B64D 27/20; B64D 2027/264; B64F 5/10; B33Y 80/00
See application file for complete search history.

(56) References Cited

U.S. PATENT DOCUMENTS

| 7,931,232 B2 * | 4/2011 | Bernardi | B64D 27/18 244/54 |
| 9,027,875 B2 * | 5/2015 | West | B64C 1/1453 244/53 R |
| 9,238,511 B2 * | 1/2016 | Woolley | B64D 27/26 |
| 10,351,254 B2 * | 7/2019 | Journade | B64D 27/26 |
| 2005/0116093 A1 * | 6/2005 | Machado | B64D 27/12 244/54 |

(Continued)

FOREIGN PATENT DOCUMENTS

| FR | 2 889 505 | 2/2007 |
| FR | 2 998 872 | 6/2014 |

(Continued)

OTHER PUBLICATIONS

Search Report for FR1760190 dated Feb. 28, 2018, 2 pages.

*Primary Examiner* — Anita M King
(74) *Attorney, Agent, or Firm* — Nixon & Vanderhye P.C.

(57) ABSTRACT

A primary structure of an aircraft power plant support pylon is disclosed having a bottom stringer and two lateral walls formed in a single piece or welded so as to form a U-shaped bottom part, and a top cover which closes the U-shaped bottom part. The U-shaped part closed by a cover makes it possible to construct a box or box structure that exhibits a rigidity suitable for taking up the forces deriving from the power plant and makes it possible to limit the number of ribs (C1 ... C10) in the structure.

14 Claims, 5 Drawing Sheets

(56) References Cited

U.S. PATENT DOCUMENTS

| | | | |
|---|---|---|---|
| 2008/0217502 A1* | 9/2008 | Lafont | B64D 27/26 248/554 |
| 2008/0251634 A1* | 10/2008 | Bernardi | B64D 27/18 244/54 |
| 2009/0294579 A1* | 12/2009 | Eve | B64D 27/18 244/54 |
| 2011/0011972 A1* | 1/2011 | Vache | B64D 27/26 244/54 |
| 2011/0121132 A1 | 5/2011 | Crook et al. | |
| 2011/0204179 A1* | 8/2011 | Skelly | B64D 27/26 244/54 |
| 2013/0140281 A1* | 6/2013 | Crook | B64D 27/18 219/121.14 |
| 2014/0151497 A1 | 6/2014 | Weir et al. | |
| 2017/0106990 A1 | 4/2017 | Journade et al. | |

FOREIGN PATENT DOCUMENTS

| | | |
|---|---|---|
| FR | 3 042 475 | 4/2017 |
| WO | 2007/036516 | 4/2007 |

* cited by examiner

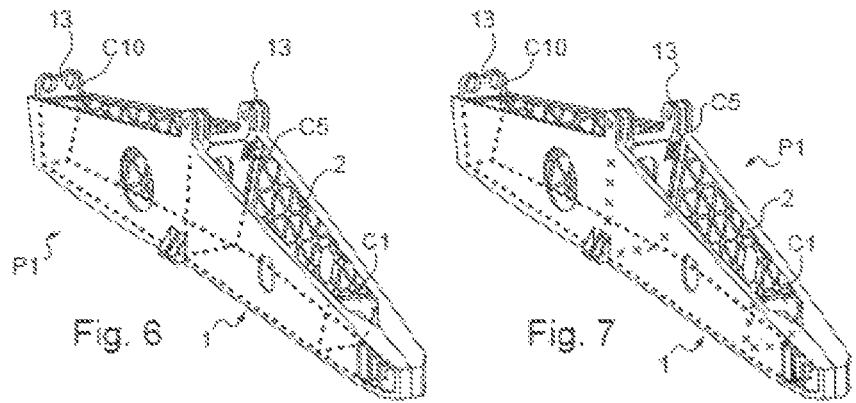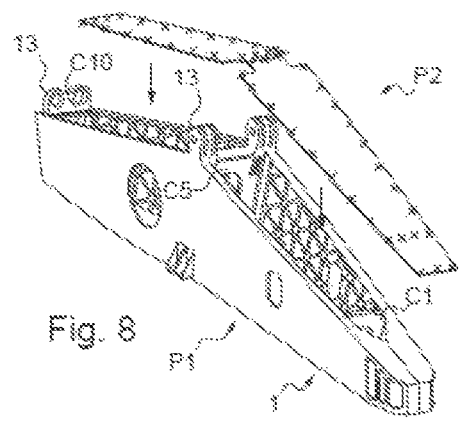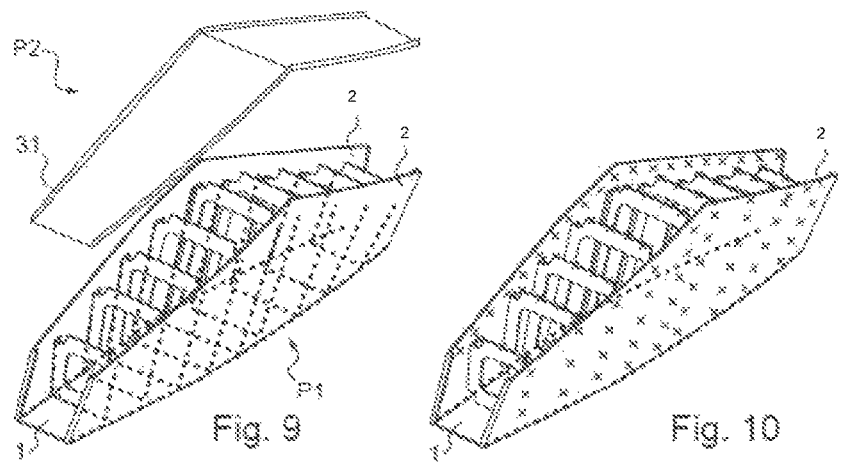

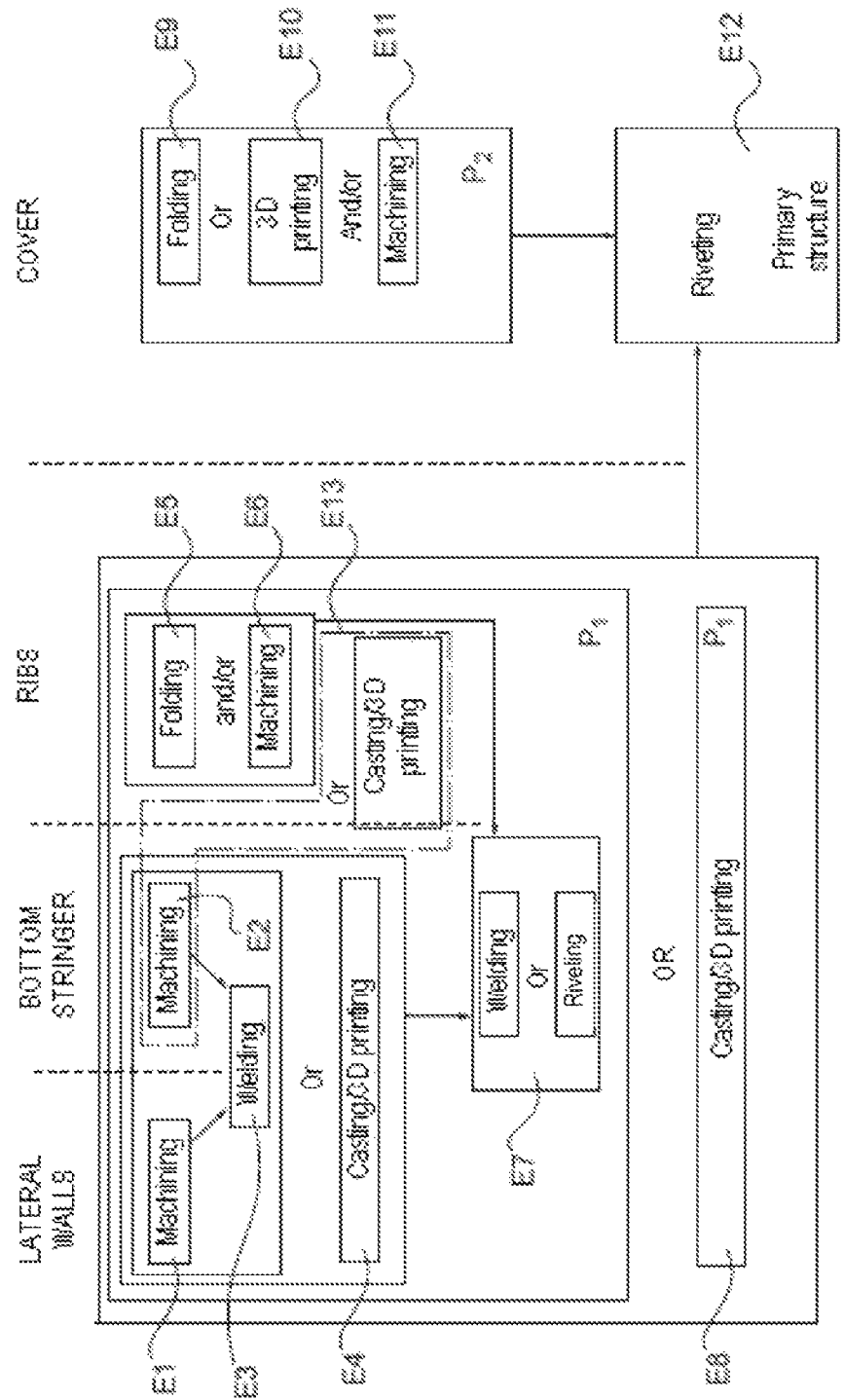

PRIMARY SUPPORT STRUCTURE FOR AN AIRCRAFT POWER PLANT SUPPORT PYLON

CROSS REFERENCE TO RELATED APPLICATION

This application claims priority to and incorporates by reference French Patent Application Number 1760190 filed Oct. 27, 2017.

BACKGROUND

1. Field of the Invention

The disclosure generally relates to aircraft power plant support pylons and, more specifically, to a primary structure of an aircraft power plant support pylon having a U-shaped lower part obtained as a single piece or by welding.

2. Description of the Related Art

An aircraft is shown in FIG. 1 having a pylon M, which is an element which constitutes the link between a propulsion assembly or power plant GP. The aircraft also includes an engine and a nacelle, and the wing V or the fuselage of the aircraft or other elements like the tail unit.

The aircraft power plant support pylon M comprises a primary structure which takes up and transmits the forces subjected to the pylon, and a secondary structure which may be an aerodynamic fairing which has no structural role. The fairing or secondary structure may accommodate the wiring and pipelines linking a power plant to the rest of the aircraft.

The primary structure may include a box-shaped structure. The box-shaped structure may include a certain number of substantially parallel ribs. The primary structure is formed by having (top and bottom) stringers and lateral plates which are fixed onto the ribs. The primary structure gives the pylon great stiffness and great strength, which are necessary to transmit the forces between the power plant and the structure of the aircraft, while guaranteeing a low weight.

The primary structure of the pylon M further comprises attachments or linking ties to link the pylon to the structure of the aircraft on one side and to the power plant GP on the other side.

Referring to FIG. 2, a prior art primary structure of a pylon for an aircraft power plant is constructed by forming a framework and then adding ribs C1 to C10 onto a bottom stringer 1. More particularly, FIG. 2 presents a primary structure of an aircraft power plant pylon in which the lateral plates on one side have been omitted to leave the internal structure visible.

The bottom stringer 1 comprises a bottom surface 11, and may comprise longitudinal flanks 12, which confers upon it a certain rigidity and allows it to serve as a base part for the production of the framework of the pylon.

The ribs C1 to C10 are assembled on the bottom stringer 1, which may have a precise geometrical conformation. The ribs C1 to C10 are aligned longitudinally, and each installed transversely, in a direction orthogonal to the longitudinal direction. Hence, the bases of the ribs C1 to C10 are therefore parallel to one another on the bottom stringer 1. Some of the ribs are installed vertically (for example, ribs C5 to C10) or slightly inclined relative to the vertical (ribs C1 to C4, the horizontal being embodied by the bottom stringer 1).

On the duly constructed framework, various anchoring means or various attachments (for the link to a power plant on the one hand, and to an aircraft structure on the other hand) are added and fixed onto the framework, onto the ribs in particular. A top stringer (in one or two parts) is added, as are lateral plates.

The various essential elements and components are assembled by riveting.

The primary structure of the pylon thus has a general box structure or box-shaped configuration, and comprises attachments linking with the structure of an aircraft 13 and attachments linking with an aircraft power plant 14.

Moreover, EP1928741 discloses a primary structure for an aircraft power plant pylon with simplified architecture through the use of a monolithic frame. Manufacturing such a primary structure is, however, complex. Furthermore, this structure can be further enhanced in order to offer aircraft architecture optimization possibilities.

SUMMARY

The invention is embodied as a primary structure of an aircraft power plant support pylon comprising a bottom stringer and two lateral walls substantially orthogonal to the bottom stringer. The bottom stringer and the two lateral walls are formed in a single piece or welded so as to form a U-shaped bottom part. The structure comprises a top cover closing the U-shaped bottom part.

A U-shaped part closed by a cover allows the construction of a box or box structure that has a rigidity suitable for taking up the forces from the power plant. The ribs make it possible, through the adaptation of their number and of their position, to obtain the mechanical characteristics desired as a function of the embodiment considered and according to the mechanical characteristics of the lateral walls. The numbers and positions of the ribs may correlate to determining the characteristics of the lateral walls.

The at least partly rivet-free construction of the bottom part makes it possible to reduce the final cost price of the primary structure and of the pylon and offers potential savings in terms of cycle times for the production of an aircraft power plant support pylon.

Limiting the number of ribs also frees up space in the box structure which is formed, which makes it possible to allocate this space to functions other than the securing of the power plant, for example to the running of electrical, hydraulic or fuel lines.

The lateral walls can have a cellular structure.

The lateral walls can in particular have substantially square cells, or substantially isosceles triangle-shaped cells.

The primary structure of an aircraft power plant support pylon can further comprise at least one rib interposed transversely in the U of the bottom part. For example, it can comprise exactly three ribs.

The bottom stringer and the ribs can be in a single piece, formed by foundry or by three-dimensional printing.

The ribs can be added and welded or riveted to the bottom stringer and to the lateral walls.

The invention relates also to a method for manufacturing a primary structure of an aircraft power plant support pylon comprising the steps of:

- forming a U-shaped bottom part comprising a bottom stringer and two lateral walls substantially orthogonal to the bottom stringer,
- forming the bottom stringer and the lateral walls in a single piece or welding them together so as to form the U-shaped bottom part, closing the top opening of the bottom part by a cover.

In such a method, the step of formation of the bottom part can comprise the casting or the three-dimensional printing of the bottom stringer and of the ribs in a single piece.

Other features and advantages of the invention will become more apparent from the following description.

BRIEF DESCRIPTION OF THE DRAWINGS

For an understanding of embodiments of the disclosure, reference is now made to the following description taken in conjunction with the accompanying drawings, in which:

FIG. 6 is a perspective view of a primary structure of an aircraft power plant support pylon with the parts assembled by welding in accordance with an exemplary embodiment;

FIG. 7 is a perspective view of a primary structure of an aircraft power plant support pylon with the parts assembled by welding and rivets in accordance with an exemplary embodiment;

FIG. 8 is a perspective view of a primary structure of an aircraft power plant support pylon with the structure formed as a single piece in accordance with an exemplary embodiment;

FIG. 9 is a perspective view of a primary structure of an aircraft power plant support pylon in which the ribs are welded to the lateral walls in accordance with an exemplary embodiment;

FIG. 10 is a perspective view of a primary structure of an aircraft power plant support pylon in which the ribs are riveted to the lateral walls in accordance with an exemplary embodiment; and, FIG. 11 is a flowchart diagram illustrating a method for manufacturing a primary structure of an aircraft power plant support pylon according to an exemplary embodiment.

DETAILED DESCRIPTION OF SOME EMBODIMENTS

Some embodiments will now be described with reference to the Figures.

Figure 1:
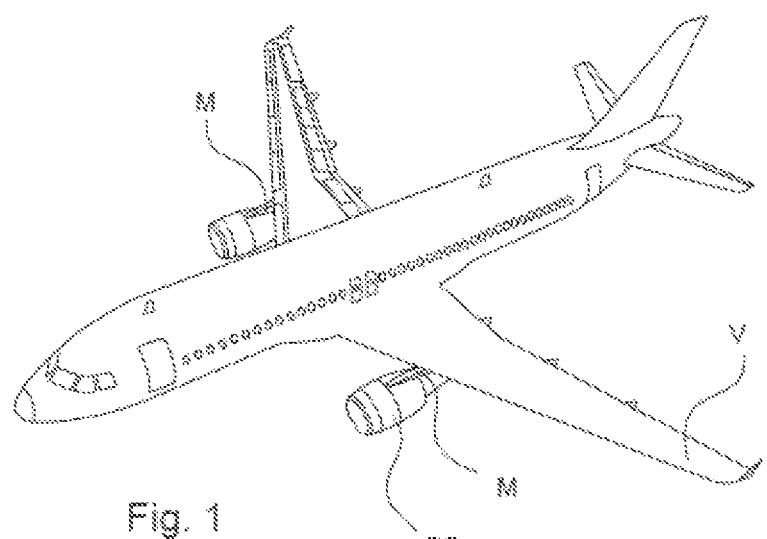
FIG. 1 is a perspective view of an aircraft comprising a power plant support pylon.
Figure 2:
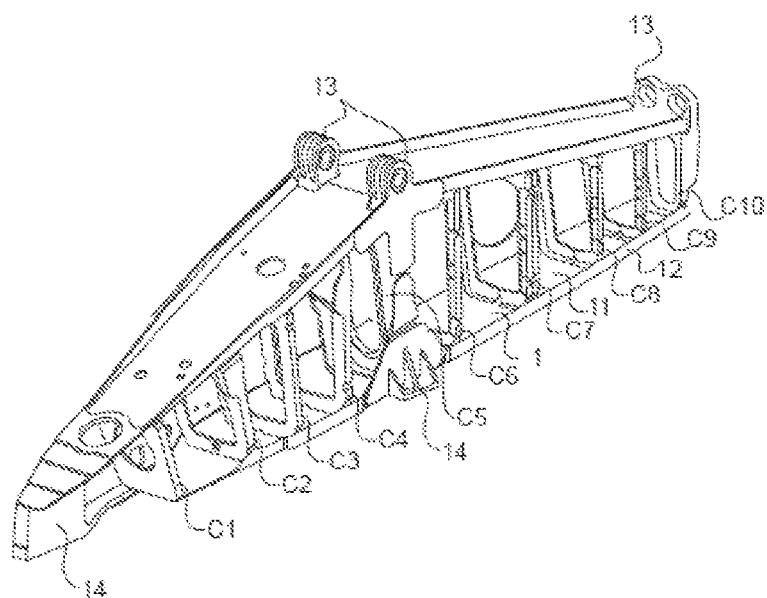
FIG. 2 is a perspective view of a prior art primary structure of an aircraft power plant support pylon.

FIG. 1 described hereinabove illustrates a commercial passenger aircraft, and FIG. 2 described hereinabove illustrates general elements or elements corresponding to the state of the art for an aircraft power plant support pylon.

Figure 3:
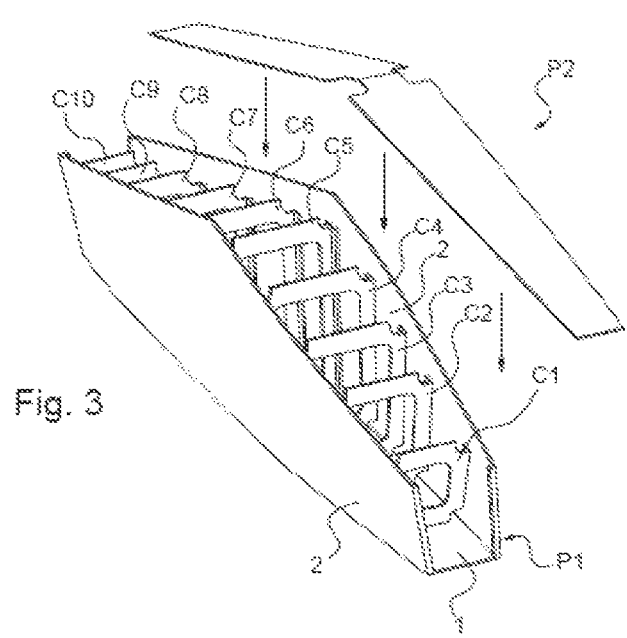
FIG. 3 is a perspective view of a primary structure of an aircraft power plant support pylon in accordance with an exemplary embodiment.

Referring now to FIG. 3, a primary structure of an aircraft power plant support pylon is shown having a U-shaped bottom part P1. The base of the U-shaped bottom part P1 is formed by the bottom stringer 1. Each branch of the U-shaped bottom part P1 is formed by a lateral wall 2. The lateral walls 2 and the bottom stringer 1 are either formed in a single piece (for example by foundry casting, or by three-dimensional printing), or assembled by welding. The U-shaped bottom part is thus formed without rivets or similar mechanical assembly means. The lateral walls 2 are attached to and integrally formed at opposing peripheral edges of the bottom stringer 1 forming a channel-shaped or U-shaped configuration bounding a top opening.

The U-shaped bottom part P1 advantageously comprises a certain number of ribs C1 . . . C10 which are contained in the U-shaped part between the lateral walls 2. The ribs are interposed transversely in the U-shaped bottom part P1. That is, the ribs are positioned orthogonally to the longitudinal direction of extension of the bottom stringer 1.

The ribs C1 . . . C10 can be formed in a single piece with the bottom stringer 1, and, in addition to or alternatively, the ribs may be formed in a single piece with the lateral walls 2 when the latter are also in a single piece with the bottom stringer 1. Alternatively, the ribs can be added in the U-shaped part and rigidly fixed to the bottom stringer 1 and to the lateral walls 2, for example by welding or riveting. The plurality of ribs may be disposed within the U-shaped bottom part P1. The sides of each rib may be secured to the inner face of the opposing lateral walls, and the bottom side of each rib may be secured to the upper face of the bottom stringer.

The U-shaped bottom part P1 is then closed, opposite the bottom stringer 1 (that is to say at the opening of the U) by a cover P2 which constitutes a top stringer for the duly constructed primary structure for a support pylon. The primary structure thus has a box form, in which are interposed the ribs necessary to its rigidity. The cover P2 may be positioned over and secured to the top opening of the U-shaped configuration in two different manners as explained hereinbelow.

Figure 4:
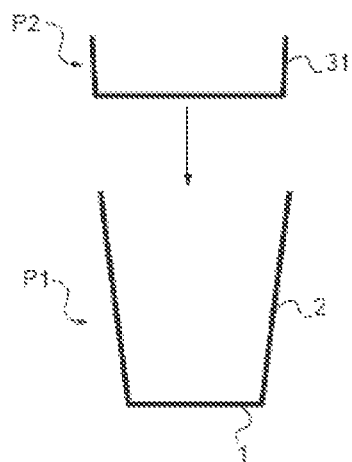
FIG. 4 is a cross-sectional view of the primary structure with a cover in accordance with an exemplary embodiment.
Figure 5:
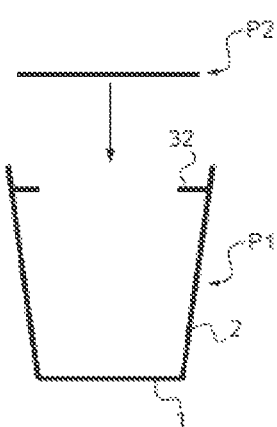
FIG. 5 is a cross-sectional view of the primary structure with a another embodiment of the cover.

Two closure methods are contemplated to be within the scope of the invention in which the cover P2 and the bottom part P1 are formed and attached to one another. These closure methods are schematically illustrated respectively in FIG. 4 and in FIG. 5. FIGS. 4 and 5 are schematic diagrams in transverse cross-sectional view of a primary pylon structure according to the invention.

In the construction method presented in FIG. 4, the cover P2 has raised flanges 31 which are intended to be linked to the top part of the lateral walls 2. For example, the raised flanges 31 can be riveted to the lateral walls 2. In this configuration, the cover P2 slides from the top opening of the U-shaped part so that the outer surface of the raised flanges 31 may become flush again the inner surface of corresponding lateral wall 2.

In the construction method presented in FIG. 5, the bottom part P1 comprises, in its top part and towards the interior of the U that it forms, top flanges 32, intended to receive the cover P2 by bearing. The cover 2 is fixed to the top flanges 32. For example, the cover P2 can be riveted to the top flanges 32. The flanges 32 extend inwardly from an inner face of opposing lateral walls providing a support for the cover P2. The top flanges 32 can be added to the lateral walls 2 or be in a single piece therewith.

The number, the position and, in some cases, the construction of the ribs, can be adapted according to the mechanical characteristics sought for the primary structure to be constructed.

In particular, if the lateral walls 2 have sufficient mechanical properties, in particular significant flexural strength, only three ribs are necessary:

an aft rib C10 and a central rib C5, which can in particular bear attachments linking with the structure of an aircraft or at least partly take up the forces from attachments linking with the structure of an aircraft, and a forward rib C1, which can at least partly take up the forces from attachments linking with an aircraft power plant.

In order for them to have a greatly enhanced rigidity by comparison to a flat panel, the panels forming the lateral walls 2 can have a cellular structure. In particular, a panel is said to have a cellular structure when it comprises cells on at least one of its faces. Cells are cavities separated from one another by ribs. They generally form a regular pattern on at least one face of the panel. The lateral walls 2 can thus present a cellular inner face, that is to say directed towards the interior of the U-shaped bottom part.

Two types of cellular panels are contemplated to be within the scope of the invention. The lateral walls can notably have an ISOGRID structure or an ORTHOGRID structure.

An ISOGRID structure has a plurality of substantially isosceles triangle-shaped cells. The corners of the triangles may be rounded therein to enhance the mechanical performance levels of the panel, and to limit the concentrations of stresses. Such a structure gives the lateral walls a great rigidity in all directions, but is complex to manufacture.

An ORTHOGRID structure has a plurality of substantially square-shaped cells. The mechanical characteristics, in particular the rigidity, of such a structure are less great than for the ISOGRID structure, but such a cellular structure is simpler and potentially less costly to produce.

When the lateral walls 2 have an ISOGRID or similar cellular structure, the bottom part P1, and therefore the primary structure that is finally constructed, can have only three ribs. These three ribs are typically the aft rib C10, the central rib C5 and the forward rib C1. A primary structure which will be greatly stressed may require the implementation of more ribs. When the lateral walls 2 have an ORTHOGRID or similar cellular structure, more than three ribs are generally necessary. That is, the use of an ISOGRID structure with a plurality of substantially isosceles triangle-shaped will allow for using fewer ribs than using an ORTHOGRID cellular structure with a plurality of square-shaped cells.

FIGS. 6, 7, and 8 schematically represent three alternative embodiments of the invention in which the lateral walls have a cellular structure of ISOGRID type. FIGS. 9 and 10 schematically represent two different embodiments of the invention in which the lateral walls have a planar inner face or a cellular structure of ORTHOGRID type.

In FIGS. 6 to 10, the welding and the weld beads are shown by a heavy dotted lines, and the rivets are shown by crosses.

More particularly, FIG. 6 illustrates a U-shaped bottom part P1 in accordance with a first embodiment. In this embodiment, the lateral walls 2 are welded to the bottom stringer 1. The bottom part P1 comprises only three ribs, namely the forward rib C1, the central rib C5 and the aft rib C10. The ribs are welded to the bottom stringer 1 and to the lateral walls 2. The central rib C5 and the aft rib C10 comprise attachment flanges 13 for attaching and linking with the structure of an aircraft.

FIG. 7 illustrates a U-shaped bottom part P1 in accordance with a second alternative embodiment. In this embodiment, the lateral walls 2 are welded to the bottom stringer 1. The bottom part P1 comprises only three ribs, namely the forward rib C1, the central rib C5 and the aft rib C10. The central rib C5 and the aft rib C10 comprise attachment flanges 13 for attaching and linking with the structure of an aircraft. The aft rib C10 is welded to the bottom stringer 1 and to the lateral walls 2. The central rib C5 and the forward rib C1 are riveted to the bottom stringer 1 and to the lateral walls 2.

FIG. 8 illustrates the two constituent parts of a primary structure of an aircraft support pylon, namely a first part P1 according to a third alternative embodiment, and a cover P2. In this embodiment, the bottom stringer 1, the lateral walls P2, and the ribs are integrally formed in a single piece. The first part P1 can thus be formed and manufactured by casting, in a foundry, or by three-dimensional printing. A machining of the cast or printed part may be necessary.

The cover P2 may be riveted to the top flanges 32 of the bottom part P1.

FIG. 9 illustrates the basic elements of a primary pylon structure, namely a U-shaped bottom part P1 according to a variation of the second embodiment in which the lateral walls have a planar inner face or a cellular structure of ORTHOGRID type and a cover P2. In this embodiment, the lateral walls 2 are welded to the bottom stringer 1. The bottom part P1 comprises a plurality of ribs, necessary for giving the primary structure the desired rigidity. The ribs are welded to the bottom stringer 1 and to the lateral walls 2. The attachments linking with the structure of an aircraft are not represented.

FIG. 10 illustrates a U-shaped bottom part P1 according to a variation of the second embodiment. In this embodiment, the lateral walls 2 are welded to the bottom stringer 1. The bottom part P1 comprises a plurality of ribs, necessary for giving the primary structure the desired rigidity. The ribs are riveted to the bottom stringer 1 and to the lateral walls 2. The attachments linking with the structure of an aircraft are not represented.

In the embodiments shown in FIGS. 9 and 10, the cover P2 may be riveted to the bottom part P1 by the raised flanges 31 that it comprises.

The invention is not limited to the exemplary embodiments or variants described above.

For example, in the second embodiment of FIGS. 9 and 10, the bottom part P1 could be in a single piece as in the example of FIG. 8.

In all the embodiments and variants, the bottom part P1 can be in a single piece, or comprise a bottom stringer 1 formed in a single piece with the lateral walls 2 and ribs added, welded or riveted to the bottom stringer 1 and to the lateral walls 2.

In all the embodiments and variants, when the ribs are added, some may be riveted and some others may be welded. The distribution between welded ribs and riveted ribs is not limited to that represented in FIG. 7. For example, the forward rib C1 can be welded or riveted, the central rib C5 can be welded or riveted, and the aft rib C10 can be welded or riveted. Each of the other ribs can be welded or riveted.

In all the embodiments and variants, the cover P2 can be fixed to top flanges 32 of the lateral walls 2, or by raised flanges 31 that it comprises. When the lateral walls comprise top flanges 32, the latter can be added or formed in a single piece with the lateral walls 2.

Referring now to FIG. 11, the diagram and flow chart illustrates a method for manufacturing a primary structure of an aircraft power plant support pylon in accordance with different exemplary embodiments of the invention.

The lateral walls 2 can be machined and manufactured by machining a plate (step E1) in order to give it the desired form and, if necessary, the desired cellular structure. Similarly, the bottom stringer 1 can be machined and manufactured by machining a plate (step E2). The lateral walls 2 and the bottom stringer 1 are welded to one another (step E3), either after or before machining, to obtain a U-shaped part.

In an alternative to the steps E1 to E3, the U-shaped part can be manufactured by casting in a foundry or by three-dimensional printing (E4). An optional machining may be performed if the U-shaped part is thus manufactured in a single piece.

The ribs C1 . . . C10 are obtained by folding (step E5) a metal sheet, followed if necessary by a machining (step E6), or directly by machining (step E6) a plate or a suitable block.

The ribs are then fixed, by either welding or riveting, in the U-shaped part (step E7).

If necessary, top flanges 32 may be added.

A bottom part P1 is thus obtained.

As an alternative to all of the steps E1 to E7 mentioned above, the bottom part P1 can be obtained in a single piece by foundry casting or three-dimensional printing (step E8). A subsequent machining step may be necessary.

If necessary, top flanges 32 may be added.

The cover P2 is obtained by folding a metal sheet (step E9), or three-dimensional printing (step E10), these steps being able to be followed by a machining (step E11), or replaced by a machining (step E11) of a suitable block.

The cover P2 may or may not have raised flanges 31.

The cover P2 is then fixed by riveting (E12) to the bottom part P1 so as to close the latter.

Variations in the steps of the method represented here are possible, without departing from the scope of the invention. For example, the bottom stringer (1) and the ribs (C1 . . . C10) can be formed in a single piece (step E13), by casting in a foundry or by three-dimensional printing, then, if necessary, machining, before the lateral walls 2 are fixed by welding to the bottom stringer 1 and to the ribs formed with the bottom stringer (step E3). In this case, the step of fixing the ribs (E7) exists only for those ribs which would not be formed in a single piece with the bottom stringer, if necessary.

The invention thus developed makes it possible to obtain a primary structure of an aircraft power plant support pylon in the form of a simple box, allowing a reduction in the costs and/or in the times and in the complexity of assembly of the pylon. The at least partly rivet-free construction, by welding, of a U-shaped bottom part makes it possible to reduce the final cost price of the primary structure and of the pylon and offers potential savings in terms of cycle times for the production of an aircraft power plant support pylon.

Limiting the number of ribs, permitted through the use of walls with a cellular structure, also frees up space in the box structure which is formed, which allows for the allocation of this space to functions other than the securing of the power plant, for example to the running of electrical, hydraulic or fuel lines.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A primary structure for an aircraft power plant (GP) support pylon, comprising:
   a bottom stringer;
   two lateral walls substantially orthogonal to the bottom stringer;
   wherein the bottom stringer and the two lateral walls are formed in a single piece or welded thereby forming a U-shaped bottom part,
   wherein the primary structure further comprises a top cover closing the U-shaped bottom part,
   wherein the U-shaped bottom part includes a pair of opposing flanges extending inwardly for supporting the top cover above the pair of opposing flanges and securing the top cover to the U-shaped bottom, and
   wherein the lateral walls have a cellular structure.

2. The primary structure of an aircraft power plant support pylon according to claim 1, wherein the lateral walls further comprise a plurality of substantially square cells.

3. The primary structure of an aircraft power plant support pylon according to claim 1, wherein the lateral walls further comprise a plurality of substantially isosceles triangle-shaped cells.

4. A primary structure for an aircraft power plant (GP) support pylon, comprising:
   a bottom stringer;
   two lateral walls substantially orthogonal to the bottom stringer;
   wherein the bottom stringer and the two lateral walls are formed in a single piece or welded thereby forming a U-shaped bottom part,
   wherein the primary structure further comprises a top cover closing the U-shaped bottom part,
   wherein the top cover or the U-shaped bottom part includes a pair of opposing flanges for securing the top cover to the U-shaped bottom,
   wherein the lateral walls have a cellular structure, further comprising at least one rib (C1 . . . C10) interposed transversely in said U-shaped bottom part.

5. The primary structure of an aircraft power plant support pylon according to claim 4, further comprising exactly three ribs.

6. The primary structure of an aircraft power plant support pylon according to claim 5, wherein the bottom stringer and the ribs (C1 . . . C10) are integrally formed as a single piece, are formed by foundry, or are formed by three-dimensional printing.

7. The primary structure of an aircraft power plant support pylon according to claim 5, wherein the ribs (C1 . . . C10) are added and welded or riveted to the bottom stringer and to the lateral walls.

8. A method of manufacturing a primary structure of an aircraft power plant support pylon, comprising the steps of:
   forming a U-shaped bottom part comprising a bottom stringer and two lateral walls having a cellular structure and substantially orthogonal to the bottom stringer,
   forming the bottom stringer and the lateral walls in a single piece or welding them so as to form said U-shaped bottom part,
   providing a cover, wherein U-shaped bottom part includes a pair of opposing flanges extending inwardly and supporting the top cover above the pair of opposing flanges and for securing the top cover to the U-shaped bottom, and
   closing the top opening of the U-shaped bottom part by the cover (P2).

9. The method according to claim 8, wherein the step of forming of the bottom part further comprises the step of casting or the three-dimensional printing of the bottom stringer and ribs in a single piece.

10. An aircraft engine support pylon, comprising:
- a bottom stringer having a first peripheral edge and an opposing second peripheral edge;
- a first lateral wall extending upwardly from the first peripheral edge and a second lateral wall extending upwardly from the second peripheral edge, wherein the first and second lateral walls and the bottom stringer form a channel-shaped structure having a closed bottom and an open top;
- wherein the bottom stringer and the two lateral walls are integrally formed in a single piece or welded along the first and second peripheral edges;
- a top cover having first and second flanges spaced apart and extending upwardly from opposing peripheral edges of the top cover, wherein the top cover is attached to and configured to close the top opening of the formed channel-shaped structure in which the first flange is attached to the first lateral wall and the second flange is attached to the second lateral wall;
- wherein the first and second lateral walls further comprise a lattice structured disposed on an inner surface of the walls; and
- at least one rib disposed between the first and second lateral walls.

11. The aircraft engine support pylon of claim 10, wherein the at least one rib is welded or riveted to the bottom stringer along a bottom edge thereof, and to the first and second lateral walls along the opposing side edges thereof.

12. The aircraft engine support pylon of claim 10, wherein the lattice structure further comprises a plurality of substantially square cells.

13. The aircraft engine support pylon of claim 10, wherein the lattice structure further comprises a plurality of substantially isosceles triangle-shaped cells.

14. A primary structure for an aircraft power plant (GP) support pylon, comprising:
- a bottom stringer;
- first and second lateral walls substantially orthogonal to the bottom stringer;
- wherein the bottom stringer and the first and second lateral walls are formed in a single piece or welded thereby forming a U-shaped bottom part,
- wherein the primary structure further comprises a top cover closing the U-shaped bottom part,
- a first flange extending inwardly from said first lateral wall and a second flange extending inwardly from said second lateral wall, and
- wherein the top cover is supported on top of the first and second flanges when secured to the U-shaped bottom part.

* * * * *